(12) United States Patent
Oh

(10) Patent No.: US 7,328,161 B2
(45) Date of Patent: Feb. 5, 2008

(54) AUDIO DECODING METHOD AND APPARATUS WHICH RECOVER HIGH FREQUENCY COMPONENT WITH SMALL COMPUTATION

(75) Inventor: Yoon-hak Oh, Suwon-si (KR)

(73) Assignee: Samsung Electronics Co., Ltd., Suwon (KR)

(*) Notice: Subject to any disclaimer, the term of this patent is extended or adjusted under 35 U.S.C. 154(b) by 627 days.

(21) Appl. No.: 10/426,351

(22) Filed: Apr. 30, 2003

(65) Prior Publication Data

US 2004/0008615 A1 Jan. 15, 2004

(30) Foreign Application Priority Data

Jul. 11, 2002 (KR) .............. 10-2002-0040402

(51) Int. Cl.
*G10L 19/00* (2006.01)
*G10L 21/00* (2006.01)
*H04R 5/00* (2006.01)
*H04B 1/00* (2006.01)
*G06F 17/00* (2006.01)

(52) U.S. Cl. .............. 704/500; 704/501; 381/22; 381/119; 700/94

(58) Field of Classification Search .......... 700/94; 381/22, 119; 704/501, 502, 500; 369/3, 369/4; 84/602, 609
See application file for complete search history.

(56) References Cited

U.S. PATENT DOCUMENTS 5,526,431 A 6/1996 Shioda et al.
5,956,674 A * 9/1999 Smyth et al. ............ 704/200.1
6,278,048 B1 8/2001 Lee et al.
2002/0178012 A1 11/2002 Wang et al.

FOREIGN PATENT DOCUMENTS

| JP | 11-317672 A | 11/1999 |
|---|---|---|
| JP | 2001-521648 A | 11/2001 |
| JP | 2005-501278 A | 1/2005 |
| KR | 2000-0075936 | 12/2000 |

\* cited by examiner

*Primary Examiner*—Vivian Chin
*Assistant Examiner*—Douglas Suthers
(74) *Attorney, Agent, or Firm*—Sughrue Mion, Pllc.

(57) ABSTRACT

A method and apparatus for performing audio post processing using mode information that indicates the degree of similarity between a right channel signal and a left channel signal in MPEG-1 layer 3 audio data, are provided. If the difference between the two channel signals is small, a first mode is used in which the high frequency component of only one channel is recovered and the recovered high frequency component is used to recover the high frequency component of the other channel. If the difference between the two channel signals is large, a second mode is selected in which the high frequency component in only one of every two frames is recovered alternately in the left channel and the right channel and the high frequency component of each of the skipped frames is interpolated based on the high frequency components of the previous frame and the next frame.

6 Claims, 5 Drawing Sheets

AUDIO DECODING METHOD AND APPARATUS WHICH RECOVER HIGH FREQUENCY COMPONENT WITH SMALL COMPUTATION

CROSS-REFERENCE TO RELATED APPLICATIONS

This application is based upon and claims priority from Korean Patent Application No. 2002-40402 filed Jul. 11, 2002, the contents of which are incorporated herein by reference.

BACKGROUND OF THE INVENTION

1. Field of the Invention

The present invention relates to a method and apparatus which reduce the amount of computation in audio post-processing, and more particularly, to a method and apparatus which recover a high frequency component in MPEG-1 layer 3 audio using stereo mode information detected in a decoder, by selecting a mode depending on a circumstance after dividing stereo modes into two modes. In a first mode, the high frequency component of only one channel is recovered and the recovered high frequency component is used to recover the high frequency component of the other channel when the difference between the two channel signals is small. In a second mode, the high frequency component in only one of every two frames is recovered alternately in the left channel and the right channel and the high frequency component of each of the skipped frames is interpolated based on the high frequency components of the previous frame and the next frame when the difference between the two channel signals is big.

2. Description of the Related Art

In an MPEG-1 layer 3 audio coding method, in order to compress data more efficiently a psychoacoustic model is used in which less bits are allocated to a high frequency component that humans cannot hear. In this case, although the compression ratio improves, high frequency components are lost. Because of the loss of the high frequency components the tone changes and the clarity of sound degrades such that depressed or dull sounds are output. Accordingly, in order to reproduce the tone of the original sound and to improve clarity, a post-processing sound quality improving method for recovering lost high frequency components is needed.

However, despite their high sound quality conventional post processing sound quality improving methods need an excessive amount of computation to perform the post processing methods. A sub-band replication (SBR) method, which is a widely-known post-processing sound quality improving method, requires about double the number of computation, performed in an MPEG-1 layer 3 decoder.

A post processing method by which a sound signal decoded in a time domain is provided in order to achieve a high frequency resolution from a frequency spectrum having a combination of a non-high frequency component and noise is disclosed in Korea Patent Laid-Open Gazette No. 2000-75936.

For a high frequency resolution the method comprises converting a time domain signal that is fast Fourier transform (FFT)-decoded into a frequency domain signal; analyzing an energy distribution in order to detect a disturbance frequency component in the frequency domain signal; detecting the amount of suppression amount on the disturbance frequency component; controlling post filtering; and reverse-converting the data converted by the post filtering.

However, the method for post processing is performed in a voice decoder to improve perceptual quality of a decoded voice when voice and audio signals are decoded. Although the purposes for improving the resolution of a high frequency component are similar, the steps of the conventional post processing are different from the present invention because the conventional post processing method comprises analyzing a frequency spectrum, and using resolution filtering high frequency. In addition, the effect of reducing the amount of computation in performing the post processing method cannot be achieved in the prior art method.

SUMMARY OF THE INVENTION

To solve the above problems, it is an objective of the present invention to provide a new audio decoding method and apparatus in which, using mode information indicating the similarity between a signal in a left channel and a signal in a right channel in MPEG-1 layer 3 audio data in order to reduce an excessive amount of computation needed in the prior art post processing method, a high frequency component is recovered by selecting a mode depending on a circumstance, after dividing stereo modes into two modes: a first mode in which the high frequency component of only one channel is recovered and the recovered high frequency component is used to recover the high frequency component of the other channel when the difference between the two channel signals is small, and a second mode in which the high frequency component in only one of every two frames is recovered alternately in the left channel and the right channel and the high frequency component of each of the skipped frames is interpolated based on the high frequency components of the previous frame and the next frame when the difference between the two channel signals is big.

According to an aspect of the present invention, there is provided a high frequency component generation method by which a high frequency component is generated in decoding audio data, the method comprising generating a high frequency component by using mode information, which comprises information on the correlation between a first channel signal and a second channel signal.

According to another aspect of the present invention, there is provided an audio decoding method which recovers a high frequency component, comprising (a) receiving an encoded audio data, decoding the data, generating an audio signal of a first channel and an audio signal of a second channel, and outputting the audio signals; (b) obtaining from the audio data signal mode information which stores information on the relation between the first channel signal and the second channel signal; (c) if the obtained mode information is a joint stereo mode value indicating that the correlation between the first channel signal and the second channel signal is great, selecting only one of the first channel and the second channel and recovering the high frequency component of the selected channel, and by predetermined modification of the generated high frequency component of the selected channel, recovering the high frequency component of the other channel; and (d) synthesizing the generated high frequency component of the selected channel with the decoded audio signal of the selected channel and outputting the synthesized signal through the selected channel, and synthesizing the generated high frequency component of the other channel with the decoded audio signal of the channel and outputting the synthesized signal through the channel.

According to another aspect of the present invention, there is provided an audio decoding apparatus which recovers a high frequency component, comprising an audio decoder which receives an encoded audio data, decodes the data, generates an audio signal and outputs the signal; a mode information analyzing unit which analyzes the received encoded audio data and finds a mode information value; a high frequency component generation unit which recovers a high frequency component of each channel according to the mode information value; and an audio synthesizing unit which synthesizes the decoded audio signal with the generated high frequency component and outputs the synthesized signal.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
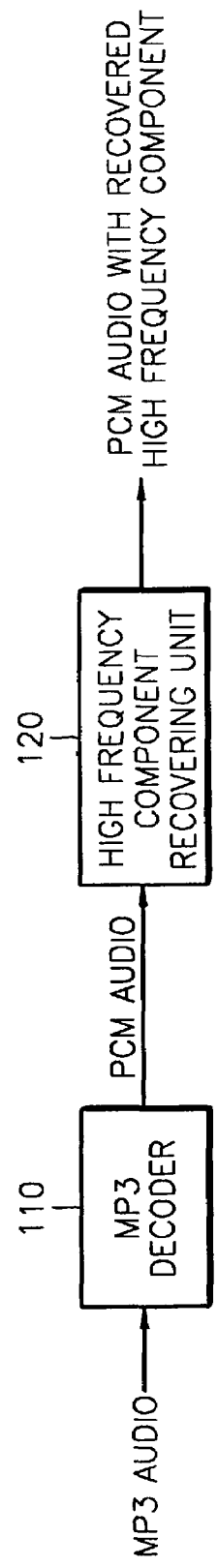
FIG. 1 is a diagram of an apparatus which post processes a pulse code modulation (PCM) signal that is decoded in an MPEG-1 layer 3 decoder.

Referring to FIG. 1, an audio data that is encoded complying with the MPEG-1 layer 3 (MP3) format is input to an MPEG-1 layer 3 decoder 110 which divides the data into a left channel component and a right channel component and generates respective pulse code modulation (PCM) data. The PCM data is input to a high frequency component recovering unit 120 which recovers the high frequency component of each of the left channel and right channel, and outputs recovered PCM audio data.

Thus, in the prior art post processing method, a high frequency domain is recovered by post processing the left channel signal and the right channel signal, respectively, which are output through the MPEG-1 layer 3 decoder 110.

However, in most audio signals, there is a high degree of redundancy between a left channel signal and a right channel signal. Accordingly, even in the MPEG-1 layer 3 encoding algorithm, a left channel signal and a right channel signal are not encoded independently in joint stereo mode.

Therefore, since a left channel signal and a right channel signal are similar to each other and share redundant information, separately post processing the left channel signal and the right channel signal causes unnecessary computation.

Figure 2:
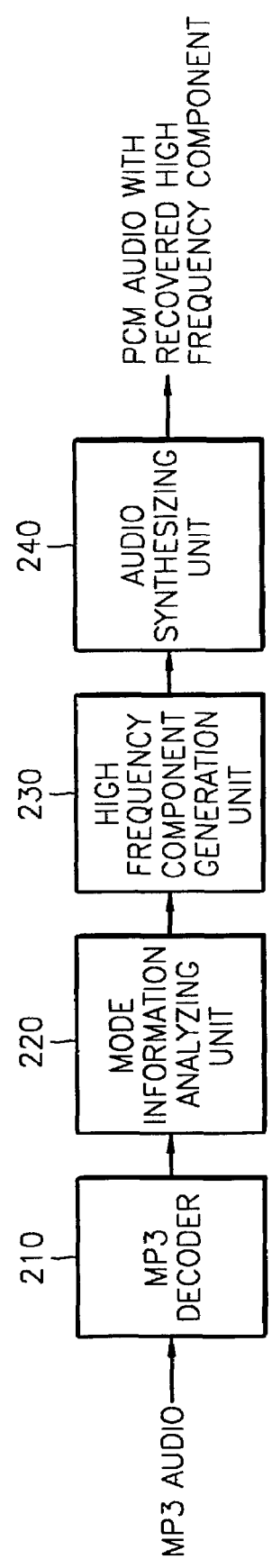
FIG. 2 is a diagram of a post processing apparatus of the present invention.

FIG. 2 is a diagram of a post processing apparatus of the present invention.

An MP3 decoder 210 receives and decodes an MPEG-1 layer 3 audio signal, generates a PCM signal, and outputs the PCM signal. The MP3 audio signal contains mode information. A mode information analyzing unit 220 analyzes mode information in the received MP3 audio signal and sends the value to a high frequency component generation unit 230.

The high frequency component generation unit 230 generates a high frequency component for each channel according to the mode information value. Depending on whether the mode information has a joint stereo mode value indicating that there is a high degree of similarity between a left channel signal and a right channel signal, or a stereo mode value indicating that there is a low degree of similarity between the two channel signals, the high frequency component generation unit 230 uses different methods to generate a high frequency component. The high frequency component generation process is the same as the prior art high frequency component generation process.

If the mode value is joint stereo mode (MODE1), it indicates that the left channel signal and the right channel signal are similar. Accordingly, the high frequency component of only one channel is generated and by using the thus generated high frequency component of the channel the high frequency component of the other channel is generated. For example, high frequency components recovered from the left channel signal are multiplied by a correction value with respect to the degree of similarity between two channels and the results are applied as the high frequency components of the right channel signal. Because there is a high degree of similarity between the two signals, this method causes little degradation in sound quality.

If the mode value is stereo mode (MODE2), it indicates that the difference between the left channel signal and the right channel signal is great. Accordingly, there is no relation between the two channels and the high frequency component of each of the two channels is generated separately. In this case, the high frequency component in only one of every two frames is recovered alternately in the left channel and the right channel and the high frequency component of each of the skipped frames is recovered by interpolation based on the high frequency components of the previous frame and the next frame separately in the left channel and the right channel. MODE2 will be explained later referring to FIG. 5.

An audio synthesizing unit 240 synthesizes the recovered high frequency components with the decoded PCM signal and outputs the synthesized signal.

Figure 3:
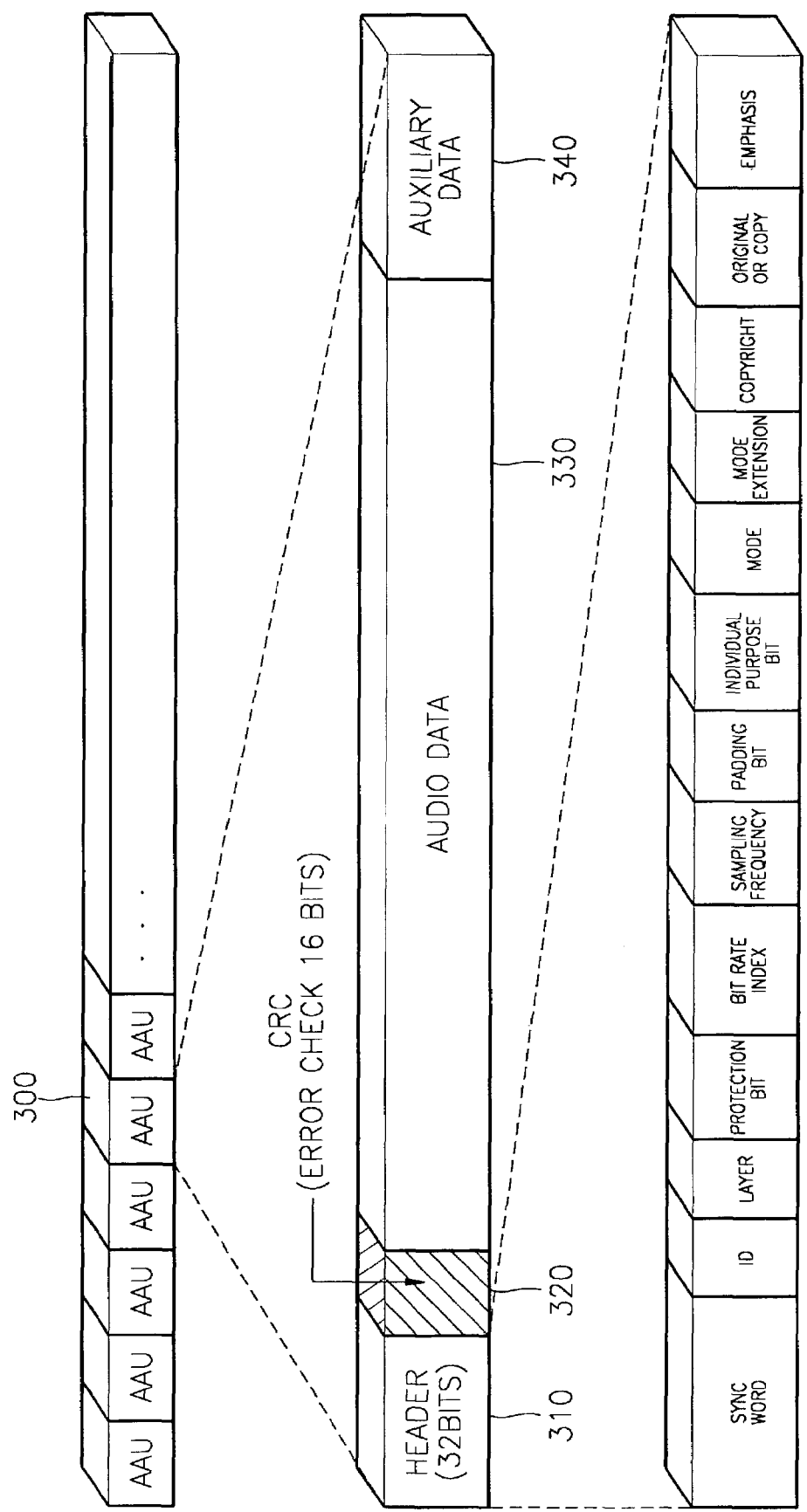
FIG. 3 is a diagram showing the format of an MPEG-1 layer 3 audio stream.

FIG. 3 is a diagram showing the format of an MPEG-1 layer 3 audio stream.

The MPEG-1 layer 3 audio stream is formed of audio access units (AAUs) 300. The AAU 300 is a minimum unit that can be decoded individually and contains a predetermined number of compressed data samples. The AAU 300 comprises a header 310, an error check field (cyclic redundancy check (CRC)) 320, an audio data field 330 and an auxiliary data field 340.

The header 310 contains a sync word, ID information, protection bit presence information, bit rate index information, sampling frequency information, padding bit presence information, an individual purpose bit, mode information, mode extension information, copyright information, information indicating original or copy data, and emphasis information.

The CRC field 320 is optional. The presence of this field is defined in the header 310. The length of this field is 16 bits.

The audio data field 330 is comprised of compressed audio data.

Auxiliary data is the data remaining at the end of the audio data when the audio data does not reach the end of one AAU. The auxiliary data field 340 may be comprised of arbitrary data other than MPEG audio data.

In the post processing method of the present invention, mode information among these information items and information on the difference between a left channel signal and a right channel signal are used to determine the correlation between channels, and according to the determined result, a high frequency component is recovered.

Figure 4:
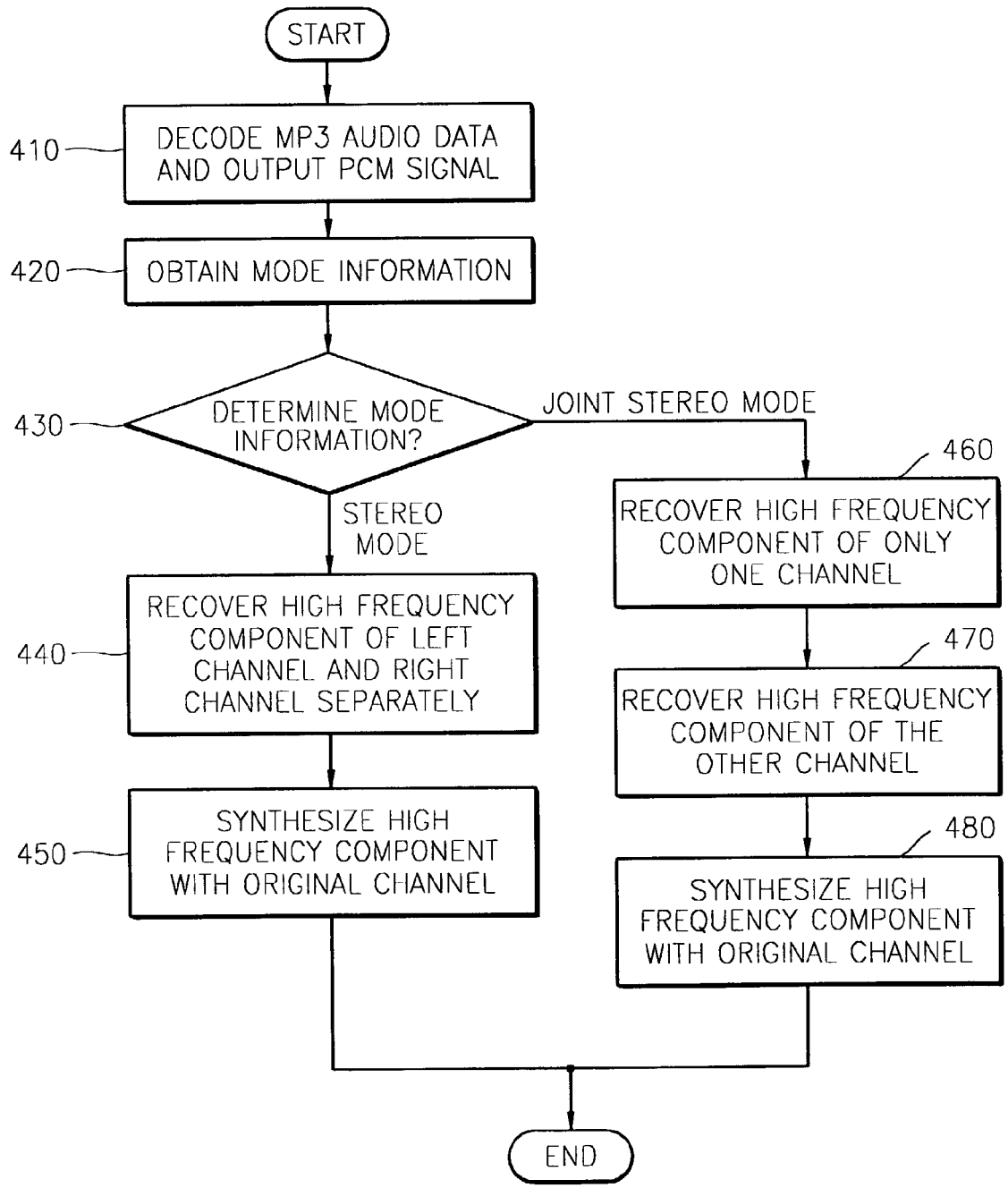
FIG. 4 is a flowchart showing the steps performed in a post processing method of the present invention.

FIG. 4 is a flowchart showing a post processing method of the present invention.

In the new post processing method, first, an MPEG-1 layer 3 audio signal is decoded to generate a PCM signal and the generated PCM signal is output (410). Using this output, mode information is obtained (420). It is determined whether the mode information contains a joint stereo mode value indicating there is a high degree of similarity between a left channel signal and a right channel signal or a stereo mode value indicating that there is a low degree of similarity between the two channel signals (430).

If the result of the determination indicates that the mode value is joint stereo mode (MODE1), it indicates that the left channel signal and the right channel signal are similar. Accordingly, the high frequency component of only one channel is generated (460) and by using the thus-generated high frequency component of the channel the high frequency component of the other channel is generated (470). For example, high frequency components recovered from the left channel signal are used as the high frequency components of the right channel signal without change, or by using information on the difference between the left channel signal and the right channel signal, the high frequency components of the right channel signal are obtained by multiplying the high frequency components by some modification values (470). The modification value, for example, may be a constant. Because the similarity between the two signals is great, this method causes little degradation in sound quality. Finally, the recovered high frequency components are synthesized with the decoded PCM signal and output (480).

If the result of the determination indicates that the mode value is stereo mode (MODE2), it indicates that the difference between the left channel signal and the right channel signal is great. Accordingly, there is no relation between the two channels and the high frequency component of each of the two channels is generated separately (440). In this case, the high frequency component in only one of every two frames is recovered alternately in the left channel and the right channel and the high frequency component of each of the skipped frames is recovered by interpolation based on the high frequency components of the previous frame and the next frame separately in the left channel and the right channel. Finally, the recovered high frequency components are synthesized with the decoded PCM signal and output (450).

In general, for most audio signals, the joint stereo mode (MODE1) is applied. That is, since the left channel signal and the right channel signal are similar, this method is applied in many cases such that the amount of computation can be cut in half. Also, when a left channel signal and a right channel signal should be separately encoded because the difference between the two channel signals is great in an audio signal having a high transmission rate of 128 kbps or more, that is, when the two signals fall under MODE2, audio post processing should be applied to the channels separately. However, even in MODE2, the MODE2 method can be used so that the amount of computation can be reduced.

The new post processing method determines whether a mode is the joint stereo mode indicating that the similarity between the two channel signals is great or the stereo mode indicating that the difference between the two channel signals is great, by using mode information detected in the MPEG-1 layer 3 decoder.

Thus recovered high frequency components are added to the left channel signal and right channel signal and output.

Figure 5:
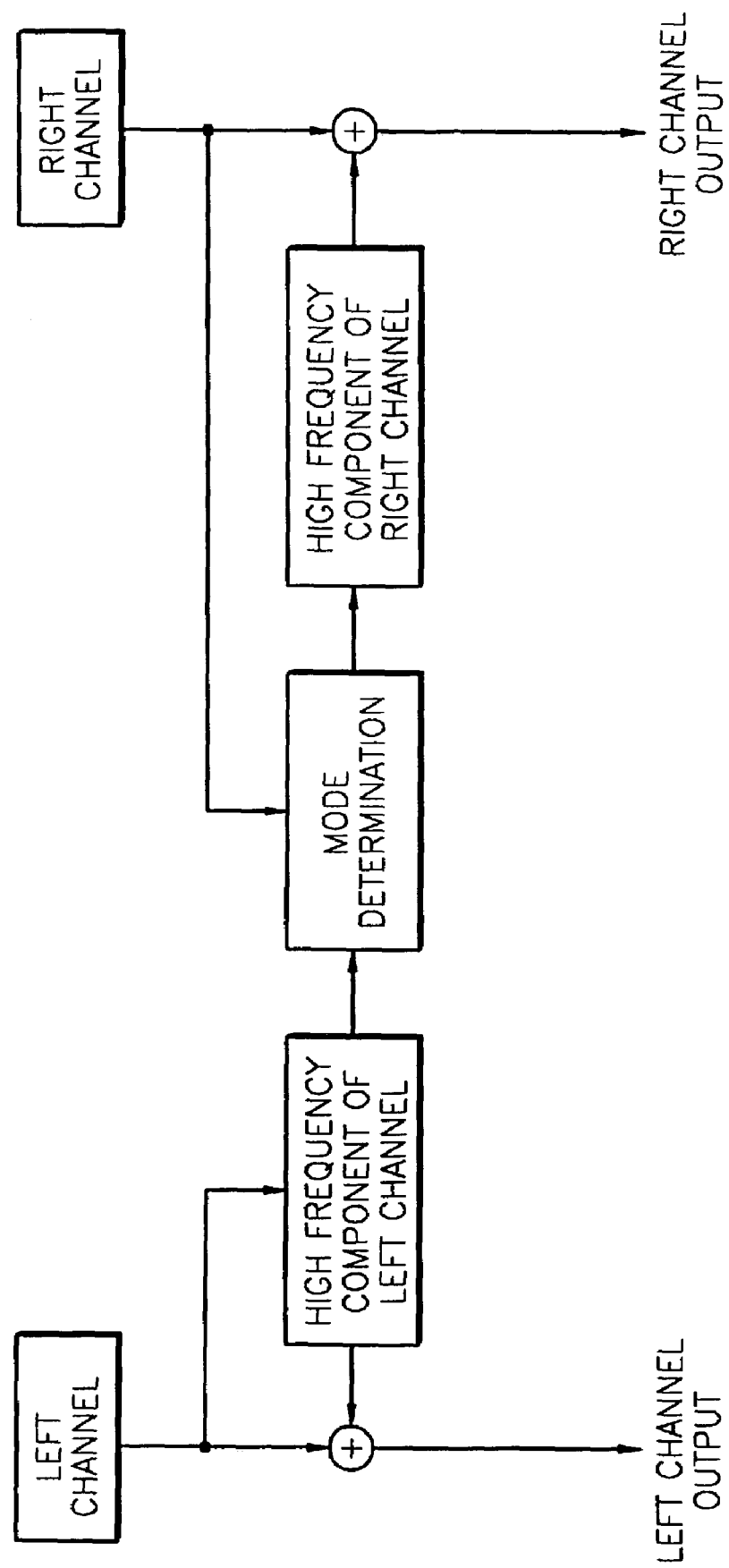
FIG. 5 is a diagram showing a method recovering a high frequency component of a right channel.

FIG. 5 is a diagram showing a method recovering a high frequency component of a right channel.

First, the high frequency component of the left channel is generated. If the mode information indicates the joint stereo mode, the generated high frequency component of the left channel is used in generating the high frequency component of the right channel; otherwise the high frequency component of the right channel is generated independently of the high frequency component of the left channel.

Figure 6:
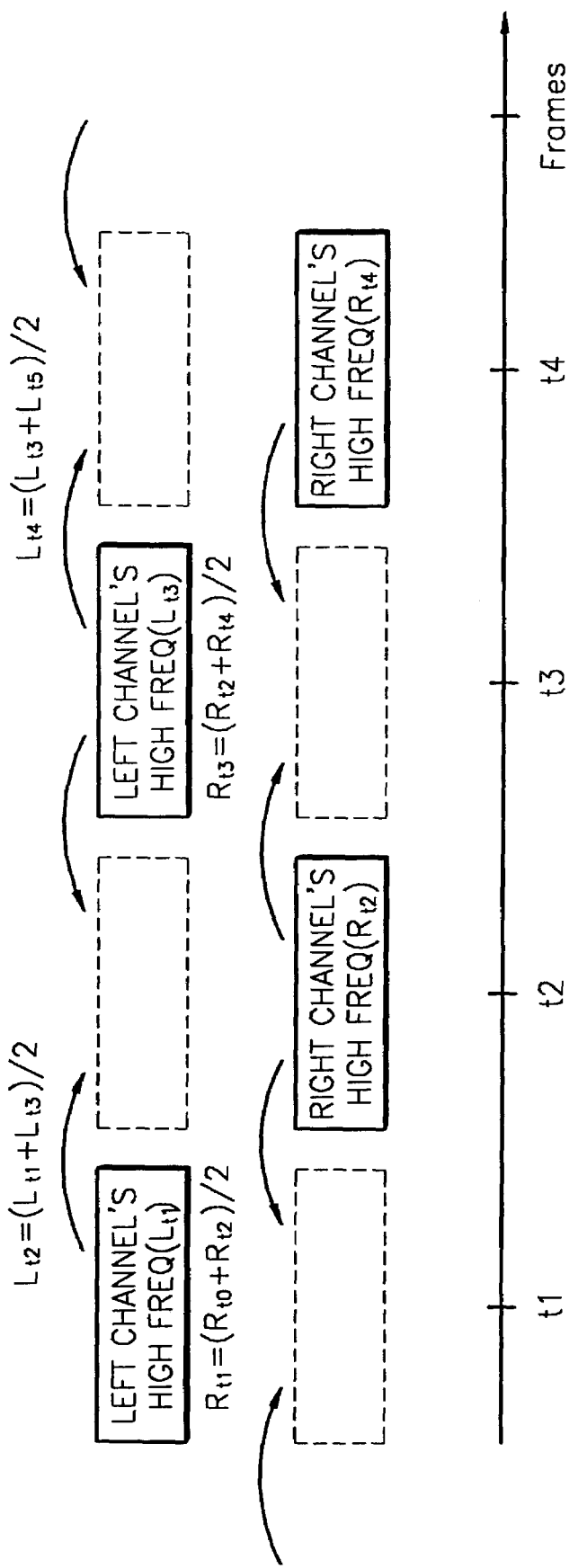
FIG. 6 is a diagram showing a method recovering a high frequency component when the difference between two channel signals is big.

FIG. 6 is a diagram showing a method of recovering a high frequency component when the difference between two channel signals is large. That is, FIG. 6 explains the process (440) for separately generating the high frequency components of the left channel and the right channel in FIG. 4. In this case, the high frequency component in only one of every two frames is recovered alternately in the left channel and the right channel and the high frequency component of each of the skipped frames is interpolated based on the high frequency components of the previous frame and the next frame. That is, the high frequency component of the left channel is recovered in the frames of time t1 and the high frequency component of the right channel is recovered in the frames of time t2. The same method is repeatedly performed for times t3, t4, t5, . . . .

Here, the high frequency component of the left channel and the high frequency component of the right channel in the frames of time t1 are referred to as $L_{t1}$ and $R_{t1}$, respectively, and in the same manner the high frequency components of the left channel and the right channel in the frames of time t2 are referred to as $L_{t2}$ and $R_{t2}$, respectively.

Then, the high frequency component of a skipped frame, that is, the high frequency component of the left channel at time t2, is recovered by interpolation based on the high frequency components of the left channel at time t1 and time t3. That is, $L_{t2}=(L_{t1}+L_{t3})/2$. Also, the high frequency component of the right channel at time t3 is recovered by interpolation based on the high frequency components of the right channel at time t2 and time t4. That is, $R_{t3}=(R_{t2}+R_{t4})/2$. Finally, the recovered high frequency components are synthesized with the decoded PCM signal and then output.

The present invention may be embodied in a code, which can be read by a computer, on a computer readable recording medium. The computer readable recording medium includes all kinds of recording apparatuses on which computer readable data are stored.

The computer readable recording media includes storage media such as magnetic storage media (e.g., ROM's, floppy disks, hard disks, etc.), optically readable media (e.g., CD-ROMs, DVDs, etc.) and carrier waves (e.g., transmissions over the Internet).

Optimum embodiments have been explained above and are shown. However, the present invention is not limited to the preferred embodiment described above, and it is apparent that variations and modifications by those skilled in the art can be effected within the spirit and scope of the present invention defined in the appended claims. Therefore, the scope of the present invention is not determined by the above description but by the accompanying claims.

As described above, while it is difficult to apply the prior art post processing method to actual products because of the excessive amount of computation despite the sound quality improvement effect, the present invention can reduce the amount of computation less than half the amount of computation used in the prior art in recovering high frequency components.

What is claimed is:

1. A high frequency component recovering method by which a high frequency component is generated in decoding audio data, the method comprising:
   recovering a high frequency component by using mode information indicating a correlation between a first channel signal and a second channel signal,
   wherein if the mode information indicates that a difference between the first and second channel signals is large, the method further comprises:
   recovering a high frequency component of a first one of every two frames in the first channel signal;
   recovering a high frequency component of a second one of the every two frames in the second channel signal;
   recovering a high frequency component of every frame not recovered in the second channel signal by interpolation based on the high frequency components of a previous frame and a next frame in the first channel signal; and
   recovering a high frequency component of every frame not recovered in the second channel signal by interpolation based on the high frequency components of a previous frame and a next frame in the second channel signal.

2. The method of claim 1, wherein if the mode information indicates that a difference between the first and second channel signals is small, the method further comprises:
   recovering the high frequency component of the first channel signal; and
   using the high frequency component of the first channel signal as the high frequency component of the second channel signal without change, or recovering the high frequency component of the second channel signal by predetermined modification of the high frequency component of the first channel signal.

3. The method of claim 1, wherein the audio data comprises MPEG-1 layer 3 audio data.

4. An audio decoding apparatus recovering a high frequency component comprising:
   an audio decoder configured to receive an encoded audio data of a channel, decode the encoded audio data, and generate a decoded audio signal;
   a mode information analyzing unit configured to analyze the received encoded audio data to determine a mode information value;
   a high frequency component generation unit configured to generate a high frequency component of the channel according to the mode information value; and
   an audio synthesizing unit configured to generate a synthesized signal by synthesizing the decoded audio signal with the high frequency component,
   wherein if the mode information indicates that a difference between first and second channel signals is large, the high frequency component generation unit is configured to generate the high frequency components of both the first channel signal and the second channel signal by generating a first high frequency component of a first one of every two frames in the first channel signal, and generating a second high frequency component of a second one of the every two frames in the second channel signal recovering a high frequency component of every frame not generated in the first channel signal by interpolation based on the high frequency components of a previous frame and a next frame in the first channel signal, and recovering a high frequency component of every frame not generated in the second channel signal by interpolation based on the high frequency components of a previous frame and a next frame in the second channel signal.

5. The apparatus of claim 4, wherein the encoded audio data comprises MPEG-1 layer 3 audio data.

6. The apparatus of claim 4, wherein if the mode information indicates that a difference between the first and second channel signals is small, the high frequency component generation unit is configured to generate the high frequency component of both a first channel signal and a second channel signal by generating high frequency component of the first channel signal, and generating the high frequency component of the second channel signal by a predetermined modification to the high frequency component of the first channel signal.

* * * * *